(12) United States Patent
Frank et al.

(10) Patent No.: US 11,561,781 B2
(45) Date of Patent: Jan. 24, 2023

(54) METHOD AND SYSTEM FOR DETERMINING AN APPROPRIATE INSTALLATION LOCATION FOR AN APPLICATION TO BE INSTALLED IN A DISTRIBUTED NETWORK ENVIRONMENT

(71) Applicant: Siemens Aktiengesellschaft, Munich (DE)

(72) Inventors: Reinhard Frank, Munich (DE); Hans-Peter Huth, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 17/253,900

(22) PCT Filed: Jun. 17, 2019

(86) PCT No.: PCT/EP2019/065905
§ 371 (c)(1),
(2) Date: Dec. 18, 2020

(87) PCT Pub. No.: WO2020/002030
PCT Pub. Date: Jan. 2, 2020

(65) Prior Publication Data
US 2021/0271462 A1    Sep. 2, 2021

(30) Foreign Application Priority Data
Jun. 26, 2018 (DE) .......................... 102018210405.0

(51) Int. Cl.
*G06F 9/44* (2018.01)
*G06F 9/455* (2018.01)
(Continued)

(52) U.S. Cl.
CPC ..................... *G06F 8/61* (2013.01)

(58) Field of Classification Search
CPC ..................... G06F 8/60; G06F 8/61
See application file for complete search history.

(56) References Cited

U.S. PATENT DOCUMENTS

| 8,706,869 | B2 | 4/2014 | Campion |
| 9,256,424 | B1* | 2/2016 | Kuchibhotla ............. G06F 8/71 |
| 2006/0271341 | A1* | 11/2006 | Brown ...................... G06F 8/20 |
| | | | 703/1 |

(Continued)

OTHER PUBLICATIONS

Alexander Keller, Determining Service Dependencies in Distributed Systems, 2001, pp. 2084-2088. https://ieeexplore.ieee.org/stamp/stamp.jsp?tp=&arnumber=937026 (Year: 2001).*

(Continued)

*Primary Examiner* — Mongbao Nguyen
(74) *Attorney, Agent, or Firm* — Lempia Summerfield Katz LLC

(57) ABSTRACT

A method is provided for determining an installation location. The method includes: providing a machine-readable description of the application to be installed; enhancing the machine-readable description with further requirements and/or properties; linking the application to be installed with an object identifier which includes the enhanced description and the requirements and/or properties of the application to be installed; linking objects existing in the distributed network environment with, in each case, at least one further object identifier which describes at least one property of an object; storing the object identifiers of the application to be installed and of the objects in the distributed network environment in a database; receiving a query regarding the application to be installed; providing the stored object identifiers of the application to be installed and of the objects for an evaluation unit; and receiving a determined appropriate installation location from the evaluation unit.

16 Claims, 1 Drawing Sheet

(51) Int. Cl.
*G06F 9/45* (2006.01)
*G06F 8/61* (2018.01)

(56) References Cited

U.S. PATENT DOCUMENTS

| | | | |
|---|---|---|---|
| 2009/0241104 A1* | 9/2009 | Amiga | G06F 8/71 717/174 |
| 2012/0198438 A1* | 8/2012 | Auer | G06F 8/61 717/176 |
| 2013/0014097 A1* | 1/2013 | Draper | G06F 8/65 717/172 |
| 2013/0247022 A1* | 9/2013 | DeJana | G06F 8/65 717/172 |
| 2014/0344461 A1 | 11/2014 | Carter | |
| 2015/0100684 A1 | 4/2015 | Maes | |
| 2016/0004528 A1* | 1/2016 | Price | G06F 8/65 717/173 |
| 2016/0342405 A1* | 11/2016 | Fawcett | H04L 67/34 |
| 2016/0344772 A1* | 11/2016 | Monahan | G06F 16/248 |
| 2017/0289060 A1 | 10/2017 | Aftab | |
| 2018/0150288 A1* | 5/2018 | Shantharam | G06F 9/45512 |
| 2019/0173736 A1* | 6/2019 | Ponnuswamy | H04L 41/145 |
| 2019/0220271 A1* | 7/2019 | Olderdissen | G06F 8/63 |
| 2019/0354403 A1* | 11/2019 | Ayyagari | G06F 3/061 |
| 2019/0369979 A1* | 12/2019 | Woods | H04L 67/1095 |

OTHER PUBLICATIONS

José L. Ruiz, Model-Based Context-Aware Deployment of Distributed Systems, 2009, pp. 164-171. https://ieeexplore.ieee.org/stamp/stamp.jsp?tp=&arnumber=5116815 (Year: 2009).*

David Barrera, Understanding and Improving App Installation Security Mechanisms through Empirical Analysis of Android, 2012, pp. 81-92. https://dl.acm.org/doi/pdf/10.1145/2381934.2381949 (Year: 2012).*

Ardagna, Danilo, et al. "Modaclouds: A model-driven approach for the design and execution of applications on multiple clouds." 2012 4th International Workshop on Modeling in Software Engineering (MISE). IEEE, 2012. pp. 50-56.

German Office Action for German Application No. 10 2018 210 405.0 dated Mar. 15, 2019.

International Search Report and the Written Opinion for International Patent Application PCT/EP2019/065905 dated Sep. 20, 2019.

OASIS: Topology and Orchestration Specification for Cloud Applications Version 1.011, XP055580323: URL:http://docs.oasis-open.org/tosca/TOSCA/v1.0/os/TOSCA-v1.0-os.pdf; Nov. 25, 2013. pp. 1-114.

Zhu, Xiaoyun, et al. "Automated application component placement in data centers using mathematical programming." International Journal of network management 18.6 (2008): 467-483.

Zimmermann, Michael, et al. "Standards-based function shipping-how to use TOSCA for shipping and executing data analytics software in remote manufacturing environments." 2017 IEEE 21st International Enterprise Distributed Object Computing Conference (EDOC). IEEE, 2017. pp. 50-60.

Mayer, Simon, Dominique Guinard, and Vlad Trifa. "Searching in a web-based infrastructure for smart things." In 2012 3rd IEEE International Conference on the Internet of Things, pp. 119-126. IEEE, 2012.

* cited by examiner

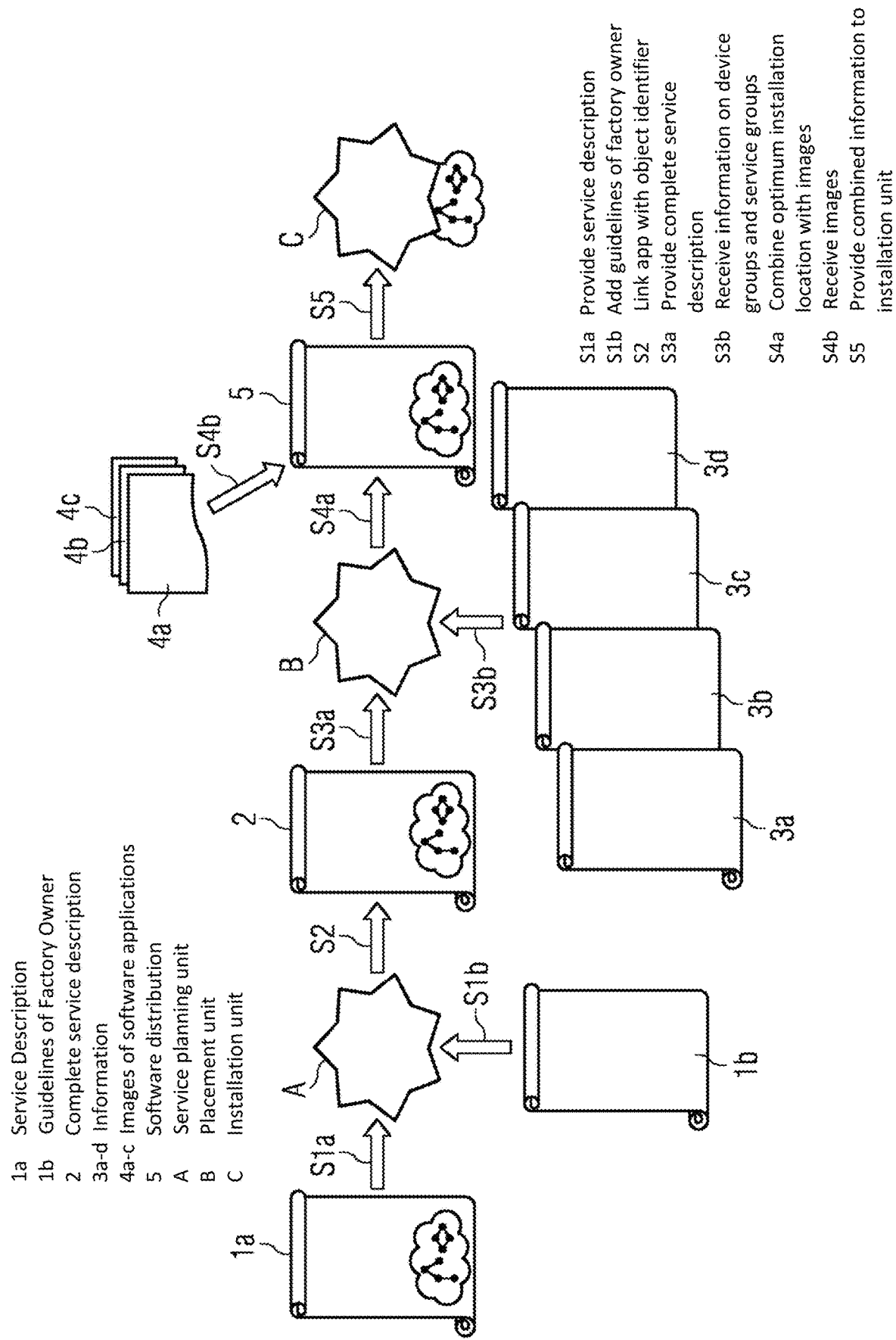

METHOD AND SYSTEM FOR DETERMINING AN APPROPRIATE INSTALLATION LOCATION FOR AN APPLICATION TO BE INSTALLED IN A DISTRIBUTED NETWORK ENVIRONMENT

The present patent document is a § 371 nationalization of PCT Application Serial No. PCT/EP2019/065905, filed Jun. 17, 2019, designating the United States, which is hereby incorporated by reference, and this patent document also claims the benefit of German Patent Application No. 10 2018 210 405.0, filed Jun. 26, 2018, which is also hereby incorporated by reference.

TECHNICAL FIELD

The present disclosure relates to a method for determining an appropriate installation location for an application to be installed and to a system for determining an appropriate installation location for an application to be installed in a distributed network environment while taking into account the communication properties with the communication partners of the application.

BACKGROUND

It is known that applications within a distributed network environment (e.g., a data network in a production environment) are often to be installed on an appropriate host. The host may be part of an environment that provides computational capacities at a production site and for this purpose is arranged in the vicinity of production machines at the outer edge of a network (so-called "edge cloud"). A host is considered to be appropriate if application-specific criteria are satisfied.

An application may include a number of software components and may have requirements with respect to various components of the edge-cloud-based production environment and with respect to the network. The so-called "edge cloud" may have a heterogeneous structure and include one or more hosts in the vicinity of or within production environments. A host may be a computer platform or a computer unit (computer) that is appropriate for performing at least one application. A host may also be a network component or a switch.

Each individual host may in this case have different properties or capabilities, resources, or restrictions. In addition, the properties or capabilities of these hosts may vary depending on how they are used and where they are installed. The network also connects the hosts to end devices and services outside the network of the production environment. Such connections of the network may have different properties, e.g., different bandwidths, delays, and the like.

In industrial environments, such as factory automation, building automation, or Supervisory Control and Data Acquisition (SCADA), the nodes of small, embedded devices may extend as far as large servers. Networks may be high-speed local industrial Ethernet variants, switched, routed, wire-bound, or wireless. Industrial applications may have a multiplicity of requirements for communication, for example, with regard to real-time requirements, required redundancy, and the like.

A further problem is that a provider of software, which may or may not be bound to specific devices, faces the problem that it cannot require or demand a specific situation or scenario from the customer. The customer on the other hand may provide that a product ordered by it may be installed and operated at its premises.

In addition to this, a software component may have requirements inter alia with regard to the runtime environment, including the network performance itself, with respect to other components. A software manufacturer is able to express such requirements terminologically, for example, by a description such as: "The database is to be operated in the vicinity of the sensors". Moreover, a customer is able to automatically find the appropriate location, if there are a number of possibilities, for the installation and operation of the software component and for configuring the required network connection, for example with respect to virtual interfaces (e.g., VLANs; Virtual Local Area Networks).

Furthermore, a service or an application may require connections to various other points in a customer installation. For instance, the information required for setting up a virtual network for the software service may be derived. For example, a database may require a connection to the public Internet and also a connection to local sensors.

Lastly, by contrast with computer centers or consumer networks, industrial Internet of Things (IoT) installations may have many more different devices over a large area. These devices may on the one hand be very different, on the other hand similar devices may also occur in large numbers, for example, a small stored-program controller (SPC) may be installed several hundred times in one factory. As a result, the configuration for an application or software component to be installed is laborious and susceptible to faults, in particular, because a machine-readable description sufficient for this problem does not exist at present, or only in a rudimentary form.

US 2014/0344461 A1 discloses techniques for intelligent deployment of services in which cloud and service data are evaluated in order to develop a service deployment plan for deploying a service in a target-cloud processing environment. When dictated by the plan or by events that trigger deployment, the service is deployed to the target-cloud processing environment in accordance with the service deployment plan.

US 2017/0289060 A1 discloses a model-driven system which automatically deploys a virtualized service, including multiple service components, on a distributed cloud infrastructure. A master-service orchestrator in this case causes a cloud platform orchestrator to retrieve a cloud services archive file, extract a cloud resources configuration template and create cloud resources at appropriate computer centers as specified. The master-service orchestrator also causes a software-defined network controller to retrieve the cloud services archive file, to extract a cloud network configuration template and to configure layer 1 through layer 3 virtual network functions and to set up routes between them.

The publication "Topology and Orchestration Specification for Cloud Applications" (Version 1.0) discusses the formal description of service templates that are used for deploying services in an IT infrastructure.

The publication "MODACLOUDS: A Model-Driven Approach for the Design and Execution of Applications on Multiple Clouds" (Danilo Ardagna et al.) presents an approach based on a model-based development that aims to assist system developers and operators in using multiple clouds for the same system and migrating them when required.

The publication "Standards-based Function Shipping— How to use TOSCA for Shipping and Executing Data Analytics Software in Remote Manufacturing Environments" (Michael Zimmerman et al.) validates the practical feasibility of various modeling approaches based on a case study from the domain of manufacturing, which is based on the open-source TOSCA ecosystem, (Open TOSCA), which provides a modeling tool, a runtime, and a self-service portal for TOSCA.

US 2015/0100684 A1 discloses a system including an application model to characterize a specific application for deployment in a cloud, a deployment manager analyzing an application requirement for a given application based on the application model and guidelines associated with the given application to substantially match infrastructure resources in the cloud to fulfill the application requirement.

SUMMARY AND DESCRIPTION

Against this background, one object of the present disclosure is to improve the automatic installation of an application on a host as part of a network of a production environment. In particular, it is desirable to install an application on a host or a specific computer unit automatically and in an almost optimum manner. The scope of the present disclosure is defined solely by the appended claims and is not affected to any degree by the statements within this summary. The present embodiments may obviate one or more of the drawbacks or limitations in the related art.

Accordingly, a computer-implemented method for determining an installation location for an application to be installed in a distributed network environment is proposed. The method includes: providing a machine-readable description of the application to be installed; enhancing the machine-readable description with further requirements and/or properties; linking the application to be installed with an object identifier, which includes a designation that is unique throughout the system and reflects the enhanced description and the requirements and/or properties of the application to be installed; linking objects that exist in the distributed network environment with, in each case, at least one further object identifier that reflects at least one property of an object; storing the object identifiers of the application to be installed and of the objects in the distributed network environment in a database; receiving a query regarding the application to be installed; providing the stored object identifiers of the application to be installed and of the objects for an evaluation unit, the evaluation unit determining the installation location for the application to be installed while taking into account the object identifiers of the objects; and receiving the determined installation location from the evaluation unit.

As a result, it is made possible that the placement decision for an application or a component of an application may take place automatically. If in this case multiple appropriate locations for the installation of software components have been found, then (optionally) the optimum installation location among these locations may be selected. The network environment may be an industrial network environment. An appropriate installation location may be understood in the sense of selecting a host at an appropriate location. The object identifier includes a designation that is unique throughout the system.

The disclosure is based on the realization that the problem of placement in industrial infrastructures is not only a problem concerning resources or use with respect to a host, but rather the location where the software or application to be installed is used and the environment where it is to be used in the future also have a role to play. A further advantage is that a time factor may also be taken into account, if for example a calculation of data on a critical host is not to be allowed during active use in production. By contrast with computer centers, in industrial networks, there may not be network infrastructures with homogeneous properties, such as 10GE capabilities and/or homogeneous computing infrastructures.

In a way corresponding to the solution, every usable part of a host or of a software component or application is provided with a specific object identifier. Such properties described by the object identifiers are collected at a central location, (e.g., in a database), and optionally combined into a working group. A working group may be defined with respect to a specific application, a specific computing unit, specific sensors, or specific actuators.

Descriptions for software distribution (e.g., deployment descriptions) use these defined working groups and thereby identify where a distribution of the software or an installation is to take place. Object identifiers may reflect every property that is required in the placement process, (e.g., the location, security requirements, type of device, and more). Instead of replicating detailed device or service descriptions, object identifiers are used to form logical groups that reflect commonalities, roles, locations, or other aspects that are important for the placement decision but are not contained in a device or software description.

Object identifiers may in this case form a hierarchy. Examples are "building5/room47" for all devices and services in room 47, building 5, or "smokedetector" for smoke detectors of various manufacturers or "OPC-UA broker" (Open Platform Communications Unified Architecture) for all software components that implement an OPC-UA messaging broker. A service that monitors smoke detectors with OPC-UA at this very location may thus be configured such that it uses these components and, based on a location object identifier, a determined location for the hosting of the service or the application is in or in the vicinity of a building 5.

By such a solution, accordingly a provider service description is brought together with customer guidelines and current data of the available "edge cloud" and network resources. This allows abstractions, which reduce the complexity of the configuration, specifically in the form of a concept for the grouping and identifying of devices, services, and locations.

According to one embodiment, the determined optimum installation location is used for the automatic installation of the application to be installed. This may take place by the information regarding the determined appropriate installation locations received being automatically provided for a deployment tool. In this way, an application may be installed at the best possible location without any action on the part of a user.

According to a further embodiment, the enhancing of the machine-readable description includes an enhancement with security guidelines. These security guidelines may include information with respect to the management of an object, (e.g., the extent to which or whether an object is managed by a supplier). This allows possible dependencies on third parties to be depicted and corresponding measures with respect to security to be achieved to be taken into account within the determination of the appropriate installation location.

According to a further embodiment, the determining of an appropriate installation location takes place while taking into account dependencies that exist between the objects and are described in their object identifiers. This has the advantage that a static provision of an installation location is avoided and instead there is an optimization of the choice of an installation location while taking into account multiple dimensions.

According to a further embodiment, the properties of the objects include a guaranteed minimum transmission bandwidth, a QoS value, an association with a logical group, an association with a logical topology, a physical place of use, and/or properties of a physical or virtual connection. Features of an object are reflected by these properties, it being possible for the objects to be computer units, sensors, actuators, locations, or relationships between at least objects themselves. An object may be a host, a service, part of a network, or a production cell in an industrial network environment.

According to a further embodiment, the requirements, and properties of the application to be installed include provision or deployment requirements, a necessary virtualizability, a maximum allowed latency time, a number of required VLAN interfaces, a responsibility regarding their management, existing security requirements, a QoS value required at a target address, and/or an association with further applications and/or objects. Such a precise definition allows a choice of installation location that is as optimum as possible, in that the likewise precisely defined properties of the various objects are taken into account with a view to the requirements.

According to a further embodiment, the further applications and/or objects are uniquely identifiable. Identifiability may take place by providing a uniquely allocated identifier, which may be assigned to a device (for example "PLC3" for a stored-program controller).

According to a further embodiment, the objects of the distributed network environment include physical devices, physical connections, virtual connections, virtual services, and/or logical topologies. The use of logical constructs has the effect in particular of facilitating a grouping of physically existing objects.

According to a further embodiment, each of the physical devices has a known physical place of use. Furthermore, it may be provided that each of the physical devices has a known management address and at least one known network interface. As a result, the identifiability of the individual devices is increased further. The management address may also be referred to as an administration address. The network interface may also be referred to as an entry point or as a feed point.

According to a further embodiment, the distributed network environment is divided into subnetworks. Subnetworks have the effect that logical structuring takes place, so that parts of a network may be addressed by a symbolic name and/or an addressing scheme.

According to a further aspect, a computer program product which causes the method explained above to be carried out on a program-controlled device is proposed.

A computer program product, such as a computer program means, may be provided or supplied as a storage medium, such as a memory card, USB stick, CD-ROM, DVD, or else in the form of a downloadable file, by a server in a network. This may take place in a wireless communication network by the transmission of a corresponding file with the computer program product or the computer program means.

According to a further aspect, a system for determining an installation location for an application to be installed in a distributed network environment is proposed. The system includes a service planning unit, which is designed for receiving a machine-readable description of the application to be installed, for enhancing the machine-readable description with further requirements and/or properties and also for linking the application to be installed with an object identifier, which includes a designation that is unique throughout the system and reflects the enhanced description and the requirements and/or properties of the application to be installed. The system further includes a database for storing the object identifiers of the application to be installed and of the objects in the distributed network environment, objects that exist in the distributed network environment being linked with, in each case, at least one further object identifier that reflects at least one property of an object. The system further includes a placement unit, which is designed for receiving a query regarding the application to be installed, for receiving the stored object identifiers of the application to be installed and of the objects for an evaluation unit, and for receiving a determined installation location from the evaluation unit, the evaluation unit being designed to determine the installation location for the application to be installed while taking into account the object identifiers of the object.

According to a further embodiment, the system includes an installation unit, which is designed to carry out based on the determined appropriate installation location the automatic installation of the application to be installed. The installation unit may be provided in the form of a deployment tool, which installs an application at the best possible location without any action on the part of a user.

Further possible implementations of the disclosure also include not explicitly mentioned combinations of features or embodiments that have been described above or will be described below with respect to the exemplary embodiments. In this respect, a person skilled in the art will also add individual aspects as improvements or supplements to the respective basic form of the disclosure.

BRIEF DESCRIPTION OF THE DRAWINGS

The disclosure is explained in more detail hereinafter based on embodiments with reference to the accompanying FIGURE.

FIG. 1 depicts an example of a deployment process using the proposed method.

Unless otherwise indicated, elements that are the same or have the same function have been provided with the same designations in the FIGURE.

DETAILED DESCRIPTION

An example is provided of a machine-readable description of an application to be installed with the name "Real-Time Factory Monitoring"® pseudocode, which includes a "collector" for monitoring the data of industrial devices and a VPN endpoint ("VPN Gateway"), which encodes everything that enters a public cloud infrastructure. The collector carries out a pre-processing and sends the result of this pre-processing to a back-end. The machine-readable description may in this case be constructed as follows:

```
app RTM
    component collector {
        node properties: Intel comp., min 2 GB mem., 20 GB stor.
        ...
        peers {
            VPN-Gateway {
                min BW ...
```

```
        }
    devices * {
        close
            min 0.5 Mbps
        }
    }
    license_key ...
}
  component VPN - Gateway {
      node properties : Intel compatible, min 0.5 GB memory
      peers {
          collector { }
          mindsphere.com, min 2 Mbps
      }
      license_key ...
  }
}
```

The specification or description presented in pseudocode contains in principle the requirements and states further necessary services that are achievable. The entry "devices *" designates any desired number of devices that may be in the vicinity of the collector component. Each of these devices requires a minimum bandwidth of 0.5 Mbit/s as connectivity. In an analogous way, further parameters may be defined as requirements for the application that are to be subsequently taken into account in determining an appropriate installation location.

Devices to be connected are to be added in advance by the operator of the application, (e.g., a factory owner). This may also take place by a list or a group, for example, in that the operator defines a group "ProfinetI-O_motortemp" and adds devices there. The operator may also add restrictions, e.g., a maximum bandwidth or a prohibition with regard to a location such as "not in hall 5".

The machine-readable description obtained from the original specification and the requirements to be newly added is subsequently transmitted to a device which carries out the method for determining an appropriate installation location in order to find the appropriate host. In this case, the particulars of the location, the actual utilization of the hosts available, and more (according to requirements) are considered.

FIG. 1 depicts an example of a deployment process using the proposed method, including a service planning unit A, a placement unit B, and an installation unit C.

In method act S1a, the service description 1a of the manufacturer is provided to the service planning unit A in the form of a machine-readable description of the application to be installed. Furthermore, in method act S1b, the guidelines of the factory owner 1b are added, containing further requirements and/or properties specified above with respect to the pseudocode presented.

In method act S2, the application to be installed is also linked by the service planning unit A with an object identifier, which includes the enhanced description and the requirements and/or properties of the application to be installed provided in advance by the factory owner, so that a complete service description 2 is created. The object identifiers of the application to be installed are stored as a complete service description in a database.

In method act S3a, the complete service description 2 is provided for a placement unit B as soon as a query with regard to an application to be installed is received. At the same time, in method act Sib, the placement unit B receives information 3a-3d on device groups and service groups, the current status of the "edge cloud", the current network status and the outline of the factory. This information was prepared in advance by linking objects that exist in the distributed network environment with, in each case, at least one further object identifier that describes at least one property of an object, the object identifiers of the objects in the distributed network environment having been stored in a database.

Once a query regarding the application to be installed has been received, the placement unit B provides the information of the stored object identifiers of the application to be installed and of the objects obtained in method acts S3a and S3b for an evaluation unit. Subsequently, the placement unit B receives a determined appropriate installation location back from the evaluation unit.

In method act S4a, the determined optimum installation location is combined by the placement unit B together with the images 4a-4c of software applications to be installed that were received in act S4b for generating topology information on the software distribution 5.

This information is subsequently provided, in method act S5, for an installation unit C, which carries out the actual installation or the deployment of software applications.

To sum up, the basic ideas of the placement requirement may be stated as follows:
1. Endpoint Groups Devices and services may be combined in groups. For example, a group with the name "Enterprise WLAN" may contain access points that are not intended for real-time traffic. Each group is a list of entries. An entry has a description, which contains the point of attachment with respect to the network (e.g., the IP address of a management interface) and a location. In the case of services, this may be the host on which the service runs.
2. Locations Instead of specifying a geographical location exactly to within a meter, a "semantic location description" that reflects the most important properties of a location may be used. This may include a physical area which includes many points and is not restricted to one point. The location may use a structured, symbolic, and user-defined naming scheme, (e.g., "location Turin/hall 5/conveyor belt 8" or "location Turin/hall 5/welding cell 23"). This allows an approximate outline to be depicted. The location may reproduce real locational information or topological, network-related information, e.g., all devices in a subnetwork or everything that is connected to a specific switch.
3. Placement The placement algorithm thus undertakes the specification of the service, extracts all services and devices mentioned there, and provides them for an evaluation unit. The evaluation unit may then consider finding a target computer that is "in the vicinity" of the required points.
4. Installation or Deployment For example, TOSCA (Topology and Orchestration Specification for Cloud Applications) may be used for deployment, in order to distribute and install the software images at the location specified by the placement unit. Alternatively, use of other software is also possible.

The exemplary embodiments above assume that there is a specification of an application that contains requirements for resources, the network QoS (Quality of Service), deployment acts, or more. This may be regarded as a digital equivalent of the present-day "data sheet". Furthermore, it is presupposed that the network QoS is associated with one or more targets, e.g., in the form of a minimum bandwidth with respect to the edge router and/or a maximum delay with respect to a specific end device. A target is in this case a device or service outside the application or within the application, but in the form of another component of the same. Furthermore, an application is linked with other applications and with devices that use this application. Devices or services that are mentioned in the specification of an application relate to a uniquely identifiable device (e.g., "PLC3") or a group of targets (e.g., "forklift group"). Optionally, it may also be provided that application may be repeatedly started or virtualized. The application may be bundled in one or more software "images", it being possible for each image to have different requirements and dependencies. An image may take the form of a container or a virtualization image. A deployment specification may also contain acts that are carried out before starting (e.g., VM preparation), during starting or after starting (e.g., start scripts) and during operation (e.g., acts for controlling an updating process).

With regard to the "edge cloud", it is assumed that it has multiple hosts. Each host may have different resources and capabilities and has interfaces. Furthermore, each node has a known location and a known management address and also an entry point.

The distributed network connects hosts of the "edge cloud" and devices and may be logically divided into subnetworks, a logical structuring meaning that parts of the network may be identified (e.g., by symbolic names and/or an addressing scheme). Accordingly, a structure at the Ethernet or IP level is not necessarily meant. The properties regarding the network topology and the network connections are available and may be taken into account as an additional input. The network may also support a kind of traffic control, for example, by SDN (software-defined networking), a proprietary solution or a preconfigured system (e.g., preconfigured VLANs). Relevant nodes (such as hosts of the "edge cloud", network nodes, or software services) have object identifiers, which depict various information required for the placement process described above.

Finally, it is presupposed that a tool for providing images (in method act S4b) exists.

It is to be understood that the elements and features recited in the appended claims may be combined in different ways to produce new claims that likewise fall within the scope of the present disclosure. Thus, whereas the dependent claims appended below depend from only a single independent or dependent claim, it is to be understood that these dependent claims may, alternatively, be made to depend in the alternative from any preceding or following claim, whether independent or dependent, and that such new combinations are to be understood as forming a part of the present specification.

While the present disclosure has been described above by reference to various embodiments, it may be understood that many changes and modifications may be made to the described embodiments. It is therefore intended that the foregoing description be regarded as illustrative rather than limiting, and that it be understood that all equivalents and/or combinations of embodiments are intended to be included in this description.

The invention claimed is:

1. A method for determining an installation location for an application to be installed in a distributed network environment, the method comprising:
providing a machine-readable description of the application to be installed;
enhancing the machine-readable description with further requirements and/or properties;
linking the application to be installed with an object identifier, which comprises a designation that is unique throughout a system representing the enhanced machine-readable description and the requirements and/or the properties required in a placement process of the application to be installed;
linking objects that exist in the distributed network environment with, in each case, at least one further object identifier comprising at least one property of an object;
storing the object identifiers of the application to be installed and of the objects in the distributed network environment in a database;
receiving a query regarding the application to be installed;
providing the stored object identifiers of the application to be installed and of the objects for evaluation;
determining an optimized installation location for the application to be installed out of a plurality of potential installation locations, wherein the optimized installation location takes into account dependencies that exist between the objects, wherein the dependencies that exist between the objects are described in the object identifiers of the objects; and
receiving the determined optimized installation location.

2. The method of claim 1, wherein the determined installation location is used for an automatic installation of the application to be installed.

3. The method of claim 2, wherein the enhancing of the machine-readable description comprises an enhancement with security guidelines.

4. The method of claim 1, wherein the enhancing of the machine-readable description comprises an enhancement with security guidelines.

5. The method of claim 1, wherein the properties of the objects comprise a guaranteed transmission bandwidth, a Quality of Service (QoS) value, an association with a logical group, an association with a logical topology, a physical place of use, properties of a physical or virtual connection, or a combination thereof.

6. The method of claim 5, wherein the requirements and/or the properties of the application to be installed comprise provision or deployment requirements, a necessary virtualizability, a maximum allowed latency time, a number of required Virtual Local Area Network (VLAN) interfaces, a responsibility regarding their management, existing security requirements, a Quality of Service (QoS) value required at a target address, an association with further applications and/or objects, or a combination thereof.

7. The method of claim 6, wherein the further applications and/or the objects are uniquely identifiable.

8. The method of claim 6, wherein the objects of the distributed network environment comprise physical devices, physical connections, virtual connections, virtual services, logical topologies, or a combination thereof.

9. The method of claim 1, wherein the requirements and/or the properties of the application to be installed comprise provision or deployment requirements, a necessary virtualizability, a maximum allowed latency time, a number of required Virtual Local Area Network (VLAN) interfaces, a responsibility regarding their management, existing security requirements, a Quality of Service (QoS) value required at a target address, an association with further applications and/or objects, or a combination thereof.

10. The method of claim 9, wherein the further applications and/or the objects are uniquely identifiable.

11. The method of claim 1, wherein the objects of the distributed network environment comprise physical devices, physical connections, virtual connections, virtual services, logical topologies, or a combination thereof.

12. The method of claim 11, wherein each physical device of the physical devices has a known physical place of use.

13. The method of claim 1, wherein the distributed network environment is divided into subnetworks.

14. A computer program product comprising instructions stored in a non-transitory computer readable storage medium, which, when the instructions are executed by a computer, the instructions cause the computer to:
provide a machine-readable description of an application to be installed;
enhance the machine-readable description with further requirements and/or properties;
link the application to be installed with an object identifier, which comprises a designation that is unique throughout a system representing the enhanced machine-readable description and the requirements and/or the properties required in a placement process of the application to be installed;
link objects that exist in a distributed network environment with, in each case, at least one further object identifier comprising at least one property of an object;
store the object identifiers of the application to be installed and of the objects in the distributed network environment in a database;
receive a query regarding the application to be installed;
provide the stored object identifiers of the application to be installed and of the objects for evaluation;
determine an optimized installation location for the application to be installed out of a plurality of potential installation locations, wherein the optimized installation location takes into account dependencies that exist between the objects, wherein the dependencies that exist between the objects are described in the object identifiers of the objects; and
receive the determined optimized installation location from the evaluation unit.

15. A system for determining an installation location for an application to be installed in a distributed network environment, the system comprising:
a database stored in a non-transitory computer readable storage medium, the database configured to store object identifiers of the application to be installed and of objects in the distributed network environment, wherein objects that exist in the distributed network environment are linked with, in each case, at least one further object identifier that reflects at least one property of an object,
wherein the system is configured to:
receive a machine-readable description of the application to be installed;
enhance the machine-readable description with further requirements and/or properties;
link the application to be installed with an object identifier comprising a designation that is unique throughout the system representing the enhanced machine-readable description and the requirements and/or the properties required in a placement process of the application to be installed;
receive a query regarding the application to be installed;
receive the stored object identifiers of the application to be installed and of the objects for evaluation;
receive a determined installation location; and
determine an optimized installation location for the application to be installed out of a plurality of potential installation locations, wherein the optimized installation location takes into account dependencies that exist between the objects, wherein the dependencies that exist between the objects are described in the object identifiers of the objects.

16. The system of claim 15, wherein the system is further configured to carry out, based on the determined installation location, an automatic installation of the application to be installed.

* * * * *

UNITED STATES PATENT AND TRADEMARK OFFICE
CERTIFICATE OF CORRECTION

PATENT NO. : 11,561,781 B2
APPLICATION NO. : 17/253900
DATED : January 24, 2023
INVENTOR(S) : Reinhard Frank et al.

It is certified that error appears in the above-identified patent and that said Letters Patent is hereby corrected as shown below:

In the Claims (Claim 14; Lines 35-36):
"receive the determined optimized installation location from the evaluation unit."

Should be replaced with:
"receive the determined optimized installation location."

Signed and Sealed this
Seventh Day of March, 2023

Katherine Kelly Vidal
*Director of the United States Patent and Trademark Office*